United States Patent [19]

DeMario

[11] Patent Number: 4,585,615
[45] Date of Patent: Apr. 29, 1986

[54] NUCLEAR FUEL SPACER GRID WITH IMPROVED GRID STRAPS

[75] Inventor: Edmund E. DeMario, Penn Hills, Pa.

[73] Assignee: Westinghouse Electric Corp., Pittsburgh, Pa.

[21] Appl. No.: 473,516

[22] Filed: Mar. 9, 1983

[51] Int. Cl.$^4$ .................................................. G21C 3/34
[52] U.S. Cl. ..................................... 376/442; 376/438; 376/439; 376/443; 376/448
[58] Field of Search .............. 376/442, 443, 444, 448, 376/439, 438

[56] References Cited

U.S. PATENT DOCUMENTS

| | | | |
|---|---|---|---|
| 3,255,091 | 6/1966 | Frisch | 376/442 |
| 3,377,254 | 4/1968 | Frisch | 376/442 |
| 4,389,369 | 6/1983 | Bryan | 376/442 |

*Primary Examiner*—Donald P. Walsh
*Attorney, Agent, or Firm*—D. E. Erickson

[57] ABSTRACT

A nuclear fuel spacer grid with improved grid straps. The grid has an egg-crate array of interleaved grid straps creating cells for enclosing the fuel rods. Near beginning of life in the reactor, the grid straps bend in a spring-like manner to flexibly grip the fuel rods with their preferably rigid protrusions. In a cell, the protrusions on two non-opposing grid straps are closed to longitudinal coolant flow while the protrusions on the remaining grid straps associated with the cell are open to such flow. Near end of life the grid straps loose resiliency due to irradiation—induced stress relaxation and the fuel rod has a loose fit against the protrusions due to radiation effects. However, the fuel rod is held in position in the cell by the coolant flow therethrough which forces the fuel rod away from the closed protrusions and into contact with the open protrusions. The protrusions in one cell are coplanar. The protrusions in the cells lie in one of two longitudinally separated planes.

22 Claims, 4 Drawing Figures

NUCLEAR FUEL SPACER GRID WITH IMPROVED GRID STRAPS

BACKGROUND OF THE INVENTION

The present invention relates generally to nuclear reactor fuel assemblies and more particularly to a grid, for the spacing of fuel rods, which has improved grid straps.

This patent application is related to the concomitantly filed patent application entitled "Nuclear Fuel Spacer Grid with Improved Outer Straps" invented by E. E. DeMario and R. P. Knott.

Nuclear fuel spacer grids are used to precisely maintain the spacing between fuel rods in a nuclear reactor core, prevent rod vibration, and provide lateral support for the fuel rods. Conventional designs of grids for nuclear reactor fuel assemblies include a multiplicity of interleaved grid straps of egg crate configuration designed to form cells which accept fuel rods. Slots are utilized to effect an interlocking engagement with adjacent straps. Each cell provides support to one fuel rod at a given axial location through the use of relatively resilient springs and relatively rigid dimples formed into the metal. Outer straps are attached together and peripherally enclose the grid straps to impart strength and rigidity to the grid. In order to minimize the lateral displacement of fuel rods and to improve the fuel characteristics of an assembly, a number of grids are spaced along the fuel assembly length.

In a pressurized water reactor (PWR), typically some of the grid's cells accept control rod guide thimbles instead of fuel rods. Each grid is held in place along the fuel assembly length by attachment to the guide thimbles.

In a boiling water reactor (BWR), typically a can surrounds the fuel rods and grids. Each grid is held in place along the fuel assembly length by a special locking rod. In one conventional arrangement, at a given grid vertical location in the fuel assembly there are four horizontally aligned grids in a square array surrounded by the can.

Designers are constantly seeking to improve the performance of grids. Areas of concern include reducing the pressure drop of the longitudinal coolant flow passing through the grid and coping with loss of spring force due to irradiation induced stress relaxation, as well as cushioning of fuel assemblies during transport. Items of particular importance to BWR fuel assemblies include cushioning the grid against seismic forces acting on the can and directing the relatively cooler water flow from along the walls of the can towards the relatively hotter flow through the interior cells of the grid.

SUMMARY OF THE INVENTION

Briefly stated, the invention is directed towards a nuclear reactor fuel assembly grid for the spacing of fuel rods. The grid has an egg-crate array of interleaved grid straps creating cells for enclosing the fuel rods. In one embodiment of the invention, one such cell has each of its associated grid straps with one or more rigid protrusions projecting into the cell. The protrusions on two non-opposing grid straps are closed to longitudinal coolant flow while the protrusions on the remaining grid straps associated with the one cell are open to such flow.

In a second embodiment of the invention, each of the cells has each of its associated grid straps with a single protrusion projecting into its corresponding cell. Any one cell's protrusions are generally coplanar. The cells' protrusion generally lie in one of two planes. A cell having its protrusions lying in one of the two planes has the protrusions in the opposing cells on the other side of its associated grid straps lying in the other of the two planes.

In a third embodiment of the invention, one such cell has each of its associated grid straps with one or more protrusions projecting into the cell. The cell has at least two resilient, non-opposing grid straps which bend to flexibly grip the associated enclosed fuel rod with the protrusions.

In a fourth embodiment of the invention, one such cell has each of its associated grid straps with one or more rigid protrusions projecting into the cell. The protrusions on two non-opposing grid straps are closed to longitudinal coolant flow while the protrusions on the remaining grid straps associated with the one cell are open to such flow. Near beginning of life the associated grid straps are resilient and bend to flexibly grip the associated enclosed fuel rod with the protrusions. Near end of life the associated grid straps have lost resiliency due to irradiation-induced stress relaxation, and the fuel rod has a loose fit against the protrusions due to radiation effects with the fuel rod being forced away from the closed protrusions and into contact with the open protrusions by the coolant flowing against the closed protrusions and through the open protrusions.

BRIEF DESCRIPTION OF THE DRAWINGS

The subject matter of the invention is particularly pointed out and distinctly claimed in the concluding portion of this specification. The invention, however, both as to organization and method operation, together with further advantages thereof, may thus be understood by reference to the following description taken in connection with the accompanying drawings, in which:

DETAILED DESCRIPTION OF THE INVENTION

Figure 1:
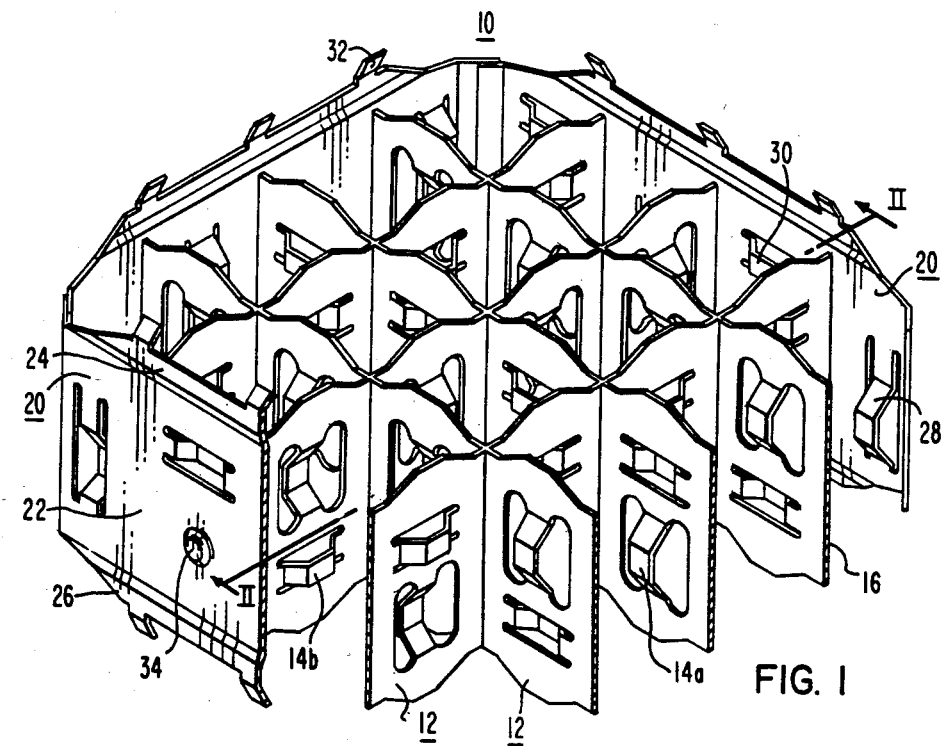
FIG. 1 is an isometric view, partially broken away, of the grid of the invention.

Reference will now be made in detail to several present preferred embodiments of the invention, an example of which is illustrated in the accompanying drawings. In the drawings, like reference characters designate like or corresponding parts throughout the several views.

Figure 2:
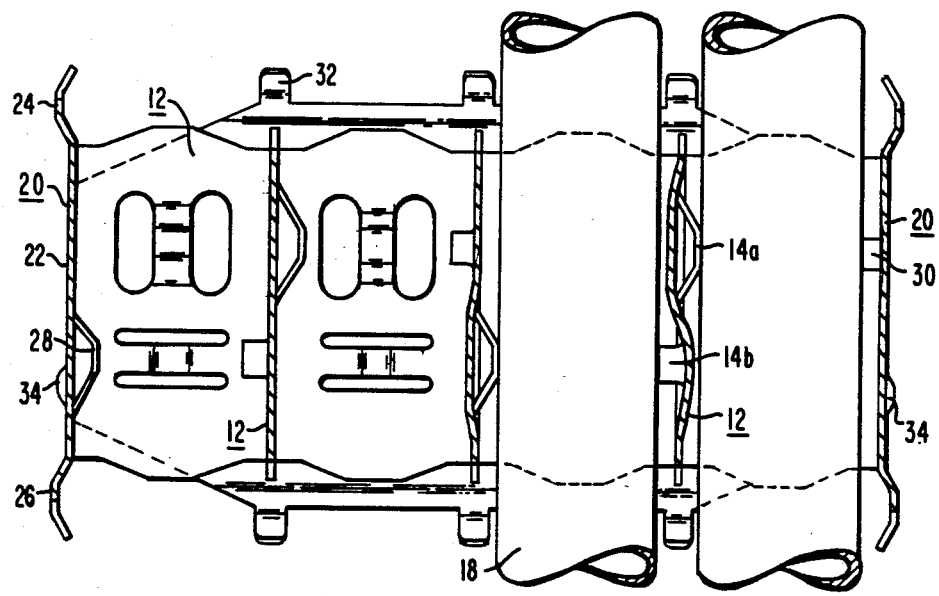
FIG. 2 is a cross-sectional elevational view of the grid illustrated in FIG. 1 taken along arrows II—II which also includes two fuel rods near the beginning of their life in a reactor.

There is shown in the figures a grid 10 for the spacing of fuel rods 18 (only two of which are shown for clarity in FIG. 2 and one in FIG. 3) in a nuclear reactor fuel assembly 38. The grid 10 has a multiplicity of interleaved grid straps 12 which are arranged in egg-crate fashion to create cells 7 for separately enclosing each of the fuel rods 18. The grid 10 also has four outer straps 20 interconnected to form a generally square-shaped array which surrounds the grid straps' heightwise edges 16.

Each outer strap 20 has a central portion 22, a top resilient lengthwise border portion 24, and a bottom resilient lengthwise border portion 26. Preferably, the border portions 24 and 26 are integral with the central portion 22 on their corresponding outer strap. The grid straps heightwise edges 16 are fastened to the central portions 22 of their associated surrounding outer straps 20. The outer straps' border portions 24 and 26 vertically extend beyond their associated central portions 22 of their common outer strap, and the border portions 24 and 26 horizontally project outwardly from the grid beyond their associated central portions 22 of their common outer strap. Preferably, the outer straps' central portions 22 are generally rigid when the outer straps 20 are attached to their associated grid straps' heightwise edges 16, and the outer straps' border portions 24 and 26 are generally inwardly curved.

It is desirable that each outer strap's central portion 22 have at least one (and preferably two) outwardly extending generally rigid studs 34. The studs 34 extend less than the projection of the border portions 24 and 26 of the associated outer strap. Preferably the studs 34 are integral with their associated outer straps 20.

The grid 10 can be utilized in any fuel assembly, such as those used in a boiling water reactor or those used in a pressurized water reactor. The outer straps' border portions 24 and 26 resiliently cushion the enclosed fuel rods from the effects of forces acting on the shipping container (not shown) used to transport fuel assemblies to reactors. The outer straps' studs 34 limit the deflection of the border portions 24 and 26 to prevent damage thereto.

Figure 4:
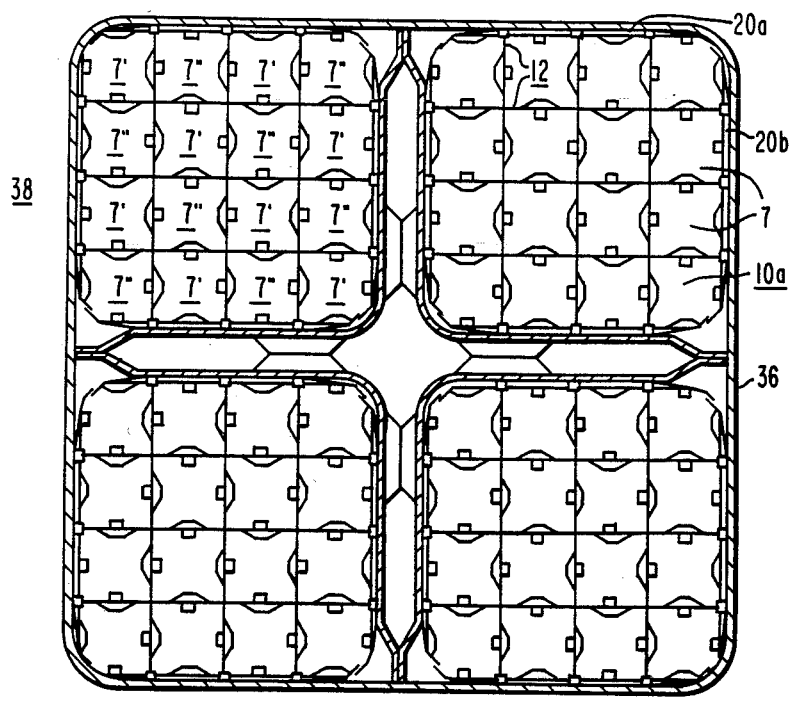
FIG. 4 is a cross-sectional planar view of a BWR fuel assembly showing four grids, identical with the grid illustrated in FIG. 1, surrounded by a can.

In a boiling water reactor fuel assembly 38 (see FIG. 4) having a can 36 surrounding a four-grid square array, two non-opposing outer straps 20a and 20b of a grid 10a have their border portions 24 and 26 (shown more clearly in FIGS. 1 and 2) generally resiliently contacting the can 36. This has several effects: to generally block longitudinal coolant flow from passing between the grid 10 and the can 36, to generally direct this blocked flow transversely towards the center of the grid 10, and to cushion the effects on the fuel rods 18 of a transverse force on the can 36. The blocking and directing of the relatively cooler flow from along the walls of the can towards the relatively hotter flow through the interior cells of the grid promotes a more uniform coolant temperature across the bundle of fuel rods 18 in the grid and increases CHF (critical heat flux) performance. The studs 34 (see FIGS. 1 and 2) extend less than the projection of their associated border portions 24 and 26 in the absence of a transverse force on the can 36. The studs 34 limit the effects of such a force, when present, on the outer straps' border portions 24 and 26. Installation of the grids 10 in the can 36 is made easier by standard tabs 32 on the outer straps' border portions 24 and 26.

It is recommended that the outer straps 20 be made of a low neutron capture cross-section material such as zirconium or a zirconium alloy, and that they be attached together and to the grid straps' heightwise edges 16 by welding.

In the grid 10, one or more and preferably each cell 7 has a longitudinal axis and has each of its associated said grid straps 12 with at least one (and preferably just one) protrusion 14 (preferably generally rigid) projecting into its corresponding said cell 7 for spacing of an associated enclosed fuel rod 18 therein.

In a first embodiment of the grid with improved grid straps, in a cell 7, the protrusions 14a on a pair of non-opposing associated grid straps are generally closed to longitudinal coolant flow therethrough while the remaining protrusions 14b on the remaining associated grid straps are generally open to such flow. It is desirable that the protrusions 14 project generally perpendicularly toward the longitudinal axis of their associated cells 7, and that the protrusions 14 in any one cell 7 are generally coplanar. Preferably, the closed protrusions 14a are generally longitudinally running arches and are generally trapezoidal shaped while the open protrusions 14b are generally transversely running arches and are likewise generally trapezoidal shaped. It is recommended that the protrusions 14 be integral with their associated grid straps 12, and that the grid straps 12 with integral protrusions 14 be made from a low neutron capture cross section material such as zirconium or a zirconium alloy (like the outer straps 20).

Figure 3:
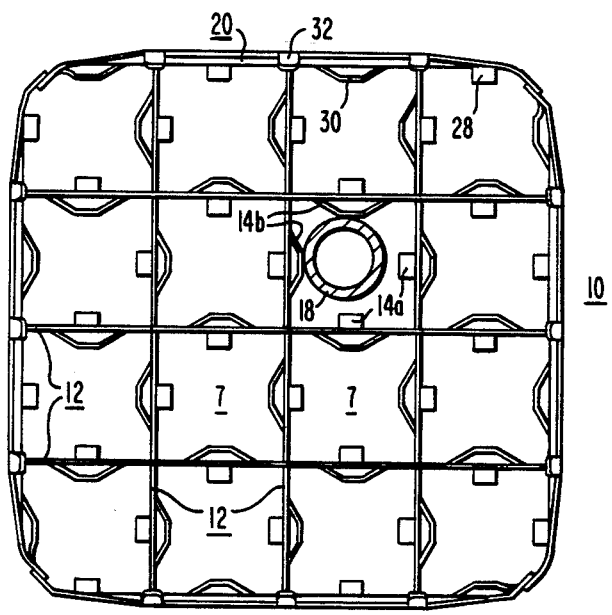
FIG. 3 is a planar view of the grid illustrated in FIG. 1 which also includes a fuel rod near the end of its life in the reactor.

In the first embodiment of the grid with improved grid straps discussed in the preceding paragraph, the associated enclosed fuel rod 18 (see FIG. 3) has a loose fit against the protrusions 14 of the grid 10. This can be designed to occur only near the end of life of the corresponding fuel assembly in the nuclear reactor as will be discussed later in another embodiment of the grid, or a loose fit can be engineered during manufacture of the fuel assembly. When a loose fit is present, from whatever cause, hydraulic forces will maintain the fuel rods 18 in proper position in the cells 7 of the grid 10. Referring to FIG. 3, the associated enclosed fuel rod 18 will be forced generally away from contact with the closed protrusions 14a and into contact with the open protrusions 14b by interaction of longitudinal coolant flow through the cell 7 generally against the closed protrusions 14a and through the open protrusions 14b.

In a second embodiment of the grid with improved grid straps, with or without incorporating the previously discussed first embodiment, the protrusions 14 in any one cell 7 are generally coplanar and lie in one of two longitudinally separated planes. The plane for the protrusions 14 in a cell 7 is chosen such that a cell 7' having its protrusions 14 generally lying in one of the two planes will have the protrusions 14 in the opposing cells 7" on the other side of its associated grid straps 12 lying in the other of the two planes (see FIGS. 1 and 4). The pressure drop of longitudinal coolant flow through the grid 10 is reduced since the protrusions 14 are not at the same elevation throughout the grid 10. Also, the grid 10 will not tilt with respect to the fuel rods 18 because the protrusions 14 are in two planes across the grid 10 instead of just in one plane.

Preferably for the previously discussed second embodiment of the grid with improved grid straps, a grid strap 12 has a single closed protrusion 14a projecting into one cell and a single open protrusion 14b projecting into the opposing cell on the other side of the grid strap, with the closed protrusions 14a on a grid strap 12 being generally colinear and the open protrusions 14b on that grid also being generally colinear. Where the closed protrusions 14a are longitudinally running arches and the open protrusions 14b are transversely running arches, the closed protrusions 14a would be generally heightwise colinear and the open protrusions 14b would be generally lengthwise colinear.

In a third embodiment of the grid with improved grid straps, with or without incorporating the previously discussed first and second embodiments, for a particular cell 7 at least two non-opposing associated grid straps 12 are resilient and bend in a spring-like manner to flexibly grip the associated enclosed fuel rod 18. The resilent grid straps 12 would bend in the area of their protrusions 14 and the protrusions 14 (preferably rigid protrusions as mentioned previously) would contact the fuel rod 18 in a flexible manner due to the resilient grid straps. It is recommended that all the associated grid straps for the particular cell are resilient, and that a plurality (and preferably all) of the associated grid straps 12 for all the cells 7 in the grid 10 are resilient and have protrusions 14 generally like the protrusions of the particular cell. As previously mentioned, it is preferred that each of the cells 7 has each of its associated grid straps 12 with a single protrusion 14 projecting into its corresponding cell. By incorporating the spring action into the grid straps 12, instead of just relying on standard external or integral spring (or spring and dimple) protrusions, the height of the grid 10 can be reduced which will result in a reduced pressure drop of longitudinal coolant flow through the grid 10.

In a fourth embodiment of the grid with improved grid straps, the provisions of the previously discussed first and third embodiments are uniquely combined (with or without incorporating the second embodiment). When the fuel rods 18 and their grid 10 are near the beginning of their lives in a nuclear reactor (see FIG. 2) the grid straps 12 are resilient and (like the third embodiment) bend in a spring-like manner in the area of their protrusions 14 to flexibly grip the enclosed fuel rod 18 with the protrusions 14. When the fuel rods 18 and their grid 10 are near the end of their lives in the nuclear reactor, the grid straps 12 have generally lost their resiliency due to irradiation—induced stress relaxation. A loose fit (like the first embodiment) of the fuel rods 18 against the protrusions 14 is designed to occur near end of life (see FIG. 3) by accounting for radiation effects (primarily the irradiation induced stress relaxation of the grid straps 12, and secondarily the irradiation induced growth of the grid 10 and the irradiation induced creep down of the fuel rods 18 reducing their diameters), as can be done by those skilled in the art. Here the enclosed fuel rod 18 will be forced generally away from contact with the closed protrusions 14a and generally into contact with the open protrusions 14b. The fuel rod 18 will be held in such position in the cell 7 due to the interaction of longitudinal coolant flow through the cell 7 generally against the closed protrusions 14a and generally through the open protrusions 14b. One or more and preferably all the cells 7 in the grid 10 have such flexible grid straps 12 and such closed and open protrusions 14a and 14b. A material such as zirconium or a zirconium alloy, chosen for the grid strap 12 and preferably integral protrusions 14, will have resiliency near the beginning of its life in a nuclear reactor and will generally lose that resiliency near its end of life due to irradiation—induced stress relaxation (as can be determined by these skilled in the art). Such a material also offers a low neutron capture cross section.

The generally rigid outer strap 20 completes the support of the fuel rod 18 in the outlying cells 7 by having its central portion 22 with relatively resilient springs 28 and relatively rigid dimples 30. Preferably the springs 28 are longer arches and the dimples 30 are shorter arches, all integral with the central portion 22 of the outer strap 20. The outer strap arches are oriented longitudinally or transversely to complete the non-opposing closed protrusion pair/non-opposing open protrusion pair pattern of the cells 7 previously discussed for the arches of the grid straps 12.

In one prototype (not yet tested in a reactor), a 4 by 4 zirconium grid about $2\frac{1}{2}$ inches square supported 16 fuel rods. The grid straps were about $\frac{7}{8}$ inch high and about 18 mils thick, and would flexibly bend (near beginning of life) about 6–8 mils due to the presence of a fuel rod. The outer strap was about 18 mils thick and had its central portion about $\frac{7}{8}$ inch high and each border portion about $\frac{1}{8}$ inch high. The border portions extended about $\frac{1}{8}$ inch vertically and projected about 37 mils horizontally. The central portion's stud extended about 32 mils. A fuel rod would deflect the central portion only about 2 mils.

It will be apparent that many modifications and variations are possible in light of the above teachings. It, therefore, is to be understood that within the scope of the appended claims, the invention may be practiced other than as specifically described.

I claim:

1. A grid, for the spacing of fuel rods in a nuclear reactor fuel assembly, comprising a plurality of interleaved grid straps arranged in an egg-crate configuration defining cells therein for the separate enclosure of each of said fuel rods, one of said cells having a longitudinal axis and having each of its associated said grid straps with at least one generally rigid protrusion projecting into said one cell for the spacing of an associated enclosed said fuel rod therein, with said one cell's said protrusions on a pair of non-opposing associated said grid straps generally closed to longitudinal coolant flow through said one cell and with said one cell's remaining said protrusions on the remaining associated said grid straps generally open to longitudinal coolant flow through said one cell.

2. The grid of claim 1, wherein the associated enclosed said fuel rod within said one cell has a loose fit against said protrusions, with said associated enclosed said fuel rod being forced generally away from contact with said closed protrusions and being forced generally into contact with said open protrusions by interaction of longitudinal coolant flow through said one cell generally against said closed protrusions and generally through said open protrusions.

3. The grid of claim 1, wherein a multiplicity of the remaining said cells have protrusions generally identical with said protrusions of said one cell.

4. The grid of claim 1, wherein each of the associated said grid straps has a single said protrusion projecting into said one cell.

5. The grid of claim 4, wherein said protrusions project generally perpendicularly toward said longitudinal axis.

6. The grid of claim 5, wherein said protrusions are generally coplanar.

7. The grid of claim 1, wherein said closed protrusions are generally longitudinally running arches, and said open protrusions are generally transversely running arches.

8. The grid of claim 7, wherein said closed and said open arches are generally trapezoidal shaped.

9. The grid of claim 1, wherein said protrusions are integral with the associated said grid straps.

10. The grid of claim 9, wherein the associated said grid straps with said protrusions consist essentially of zirconium.

11. A grid, for the spacing of fuel rods in a nuclear reactor fuel assembly, comprising a plurality of interleaved grid straps arranged in an egg-crate configuration defining cells therein for the separate enclosure of each of said fuel rods, one of said cells having a longitudinal axis and having each of its associated said grid straps with at least one generally rigid protrusion projecting into said one cell for the spacing of an associated enclosed said fuel rod therein, with said one cell's said protrusions on a pair of non-opposing associated said grid straps generally closed to longitudinal coolant flow through said one cell and with said one cell's remaining said protrusions on the remaining associated said grid straps generally open to longitudinal coolant flow through said one cell, wherein near beginning of life the associated said grid straps are resilient and bend in a spring-like manner in the area of their said protrusions to flexibly grip the associated enclosed said fuel rod with said protrusions, and wherein near end of life the associated said grid straps have generally lost their resiliency due to irradiation-induced stress relaxation and the associated enclosed said fuel rod has a loose fit against said protrusions due to radiation effects, with the associated enclosed said fuel rod being forced generally away from contact with said closed protrusions and being forced generally into contact with said open protrusions, by interaction of longitudinal coolant flow through said one cell generally against said closed protrusions and generally through said open protrusions.

12. The grid of claim 11, wherein a multiplicity of the remaining said cells have their associated said grid straps with protrusions generally identical with the associated said grid straps with said protrusions of said one cell.

13. The grid of claim 12, wherein each of said cells has each of its associated said grid straps with a single said protrusion, wherein said protrusions in any one said cell are generally coplanar, with said protrusions in said cells generally lying in one of two longitudinally separated planes such that a said cell having its protrusions generally lying in one of said two planes has the protrusions in the opposing said cells on the other side of its associated said grid straps lying in the other of said two planes to reduce the pressure drop of longitudinal coolant flow through said grid.

14. The grid of claim 13, wherein a said grid strap having a single said closed protrusion projecting into one said cell has a single said open protrusion projecting into the opposing said cell on the other side of said grid strap.

15. The grid of claim 14, wherein said closed protrusions of any particular said grid strap are generally colinear and wherein said open protrusions of said particular said grid strap are generally colinear.

16. The grid of claim 11, wherein each of the associated said grid straps has a single said protrusion projecting into said one cell.

17. The grid of claim 16, wherein said protrusions project generally perpendicularly toward said longitudinal axis.

18. The grid of claim 17, wherein said protrusions are generally coplanar.

19. The grid of claim 11, wherein said closed protrusions are generally longitudinally running arches, and said open protrusions are generally transversely running arches.

20. The grid of claim 19, wherein said longitudinal and said transverse arches are generally trapezoidal shaped.

21. The grid of claim 11, wherein said protrusions are integral with the associated said grid straps.

22. The grid of claim 21, wherein the associated said grid straps with said protrusions consist essentially of zirconium.

* * * * *